Patented Nov. 28, 1939

2,181,140

UNITED STATES PATENT OFFICE 2,181,140

CATALYTIC HYDROGENATION OF EPSILON-CAPROLACTAM TO AMINES

Wilbur A. Lazier and George W. Rigby, Wilmington, Del., assignors to E. I. du Pont de Nemours & Company, Wilmington, Del., a corporation of Delaware No Drawing. Application September 29, 1938, Serial No. 232,309

5 Claims. (Cl. 260—583)

This invention relates to the hydrogenation of cyclic amides and more particularly to the formation of amines by the catalytic hydrogenation of ε-caprolactam.

The object of this invention, therefore, is to provide a method for catalytically hydrogenating ε-caprolactam. Another object is to prepare useful amines from ε-caprolactam. A further object is to prepare hexamethylenediamine from ε-caprolactam. Other objects will appear from the reading of the following description of the invention.

These objects are accomplished in the present invention by contacting ε-caprolactam and hydrogen with a hydrogenating catalyst at an elevated temperature and pressure.

The following examples illustrate the preferred embodiments of the invention and are submitted for purposes of illustration only, not as limitations of the invention.

Example I

Thirty parts of ε-caprolactam prepared by the Beckmann rearrangement of cyclohexanone oxime (Organic Syntheses, volume 17, p. 60) was mixed with 20 parts of liquid ammonia and 5 parts of an active nickel-on-kieselguhr catalyst in a suitable pressure vessel. The mixture was heated to 200° to 210° C. under 2800 pounds per square inch of hydrogen pressure with efficient agitation during four hours. The product was then cooled, dissolved in methanol, filtered free of catalyst and distilled. After removal of the methanol, the main product, boiling at about 110° C. at 34 mm., was collected. This material was identified as hexamethylenediamine by the preparation of the picrate, m. p. 222.5° C. The remainder of the material consisted of ε-caprolactam, b. p. 128°/10 mm., and a high molecular weight, horny polymer of this compound. These latter substances may be recycled and thus transformed into further quantities of hexamethylenediamine.

Example II

One hundred parts of ε-caprolactam prepared by the Beckmann rearrangement of cyclohexanone oxime (Organic Syntheses, volume 17, p. 60) was mixed in a suitable pressure vessel with seventy-five parts of dioxane and fifteen parts of barium-copper-chromite. A pressure of 3000 pounds per square inch of hydrogen was applied and the mixture heated to 260° C. with efficient agitation for four and a half hours. After cooling to room temperature and reducing the pressure to atmospheric, the product was dissolved in methanol, filtered free of catalyst and distilled. The first fraction (after removal of the methanol) boiling at 90° to 100° C. consisted of the water binary of hexamethyleneimine. Identification was confirmed by preparation of the picrate, m. p. 146° C. The second fraction, boiling at 100° to 110° C. at 30 mm., consisted of hexamethylenediamine (picrate, m. p. 222.5° C.). The remainder of the material consisted of ε-caprolactam and a high molecular weight, horny polymer of this compound. These latter two substances may be recycled to produce more amines.

Example III

The vapors of ε-caprolactam together with ten molecular equivalents of hydrogen and eight molecular equivalents of ammonia were passed over a hydrogenating catalyst, consisting of pellets of cobalt-cadmium-chromite, heated to 335° C. under a pressure of 3000 pounds per square inch. Conditions were chosen such that a time of contact of about 60 seconds was maintained. Under these conditions, the major product was hexamethyleneimine with a minor amount of hexamethylenediamine.

By using a more active catalyst such as pelleted nickel-on-kieselguhr, temperatures of about 275° C. and atmospheric pressure may be used.

In the practice of this invention hydrogenation catalysts in general are operative for carrying out the process. There may be employed as catalysts the hydrogenating metals of group VIII and of sub-group B in groups I and II of the periodic table, either alone, in admixture or combined with a difficultly reducible oxide of a metal of the 6th group; for example, nickel or cobalt and nickel-cadmium-chromite, nickel-cobalt-cadmium-chromite, cobalt chromite, nickel-on-magnesia, Raney nickel, cobalt-on-kieselguhr, nickel chromite, and copper chromite. As examples of other hydrogenation catalysts that may be employed are the zinc-copper-chromite catalysts and the zinc-copper-cadmium-chromite catalysts. These catalytic materials are preferably used in a finely divided form and may be deposited on a porous support such as pumice, kieselguhr, alumina gel and silica gel. Catalytic powders are conveniently used in the process by compressing same into pellets or briquettes of suitable size. Stabilized catalysts containing a substantial portion of oxide, catalysts comprising the carbonate, oxide or hydroxide of the hydrogenating metal deposited on an inert support and catalysts in which the hydrogenating metal is combined with a non-reducible oxide are preferably reduced in a stream of hydrogen-containing gas prior to use.

While temperatures of from 200° to 335° have been employed in the examples, it has been found that temperatures of from 200° to 400° C. are operable although we prefer to employ the lower temperatures as, for example, 225° to 275° C. for operation in liquid phase and the higher temperatures such as, for example, from 250° to 335° C. for operation in vapor phase.

Hydrogen pressures may be used which range from atmospheric to the maximum determined by the practical limitations of the apparatus used in carrying out the reaction. It is of course advisable when working in the liquid phase to maintain a pressure higher and a temperature lower than the corresponding critical values for liquid ammonia. In this connection it might be noted that the vapor pressure of ammonia at 50° C. is 15,000 mm. (19.7 atmospheres or 200 pounds per square inch). Hydrogen pressures of from 500 to 10,000 pounds per square inch are recommended for liquid phase operation and from atmospheric to 4000 pounds per square inch for vapor phase operation. It has been found preferable to work at moderately high pressures of about 2000 to 3000 pounds per square inch since under these high pressures the reaction proceeds more rapidly.

In place of the ammonia there may be used primary and secondary amines and substances which yield ammonia or primary or secondary amines under the reaction conditions. Substances capable of yielding ammonia are, for example, ammonium carbonate, urea, and the like. Examples of primary and secondary amines are methyl, ethyl, butyl, nonyl, and 9,10 octadecenyl amines, ethylene diamine, cyclohexyl amine, aniline, mono-N-alkylated anilines, etc. These various compounds that may be used, including ammonia, are termed "amomonia substances."

In place of the caprolactam, espilon-aminocaproic acid may be used although we prefer to use the lactam.

The hydrogenation of ϵ-caprolactam provides a new and useful route to hexamethylenediamine and other amines; e. g., hexamethyleneimine, from cyclohexanone as a starting material. This diamine is a valuable intermediate for the preparation of polymeric materials. Moreover, by alterations in conditions of hydrogenation, one may obtain hexamethyleneimine, an equally valuable chemical substance.

As many apparently widely different embodiments of this invention may be made without departing from the spirit and scope thereof, it is to be understood that we do not limit ourselves to the specific embodiments thereof except as defined in the appended patent claims.

We claim:

1. The process for the production of amines which comprises catalytically hydrogenating epsilon-caprolactam at a temperature between about 200° C. and about 400° C.

2. The process for the production of amines which comprises catalytically hydrogenating epsilon-caprolactam at a temperature between about 200° C. and about 400° C. in the presence of an ammonia substance selected from the group consisting of ammonia, ammonnium carbonate, urea, alkyl, cycloaliphatic, and aryl primary and secondary amines.

3. The process for the production of amines which comprises catalytically hydrogenating epsilon-caprolactam at a temperature between about 200° C. and about 400° C. in the presence of ammonia.

4. The process for the production of amines which comprises catalytically hydrogenating epsilon-caprolactam in the liquid phase at a temperature of about 225° C. to about 275° C.

5. The process for the production of amines which comprises catalytically hydrogenating epsilon-caprolactam in the vapor phase at a temperature of about 250° C. to about 335° C.

WILBUR A. LAZIER.
GEORGE W. RIGBY.